C. WILSON.

Measuring Heights and Distances.

Patented Sept. 29, 1868.

WITNESSES

INVENTOR
Charles Wilson

C. WILSON.
Measuring Heights and Distances.
No. 82,669.
3 Sheets—Sheet 2.
Patented Sept. 29, 1868.
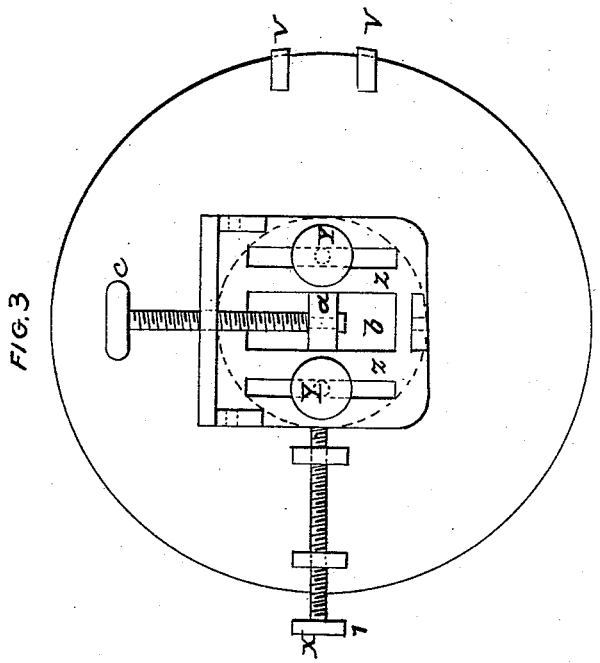
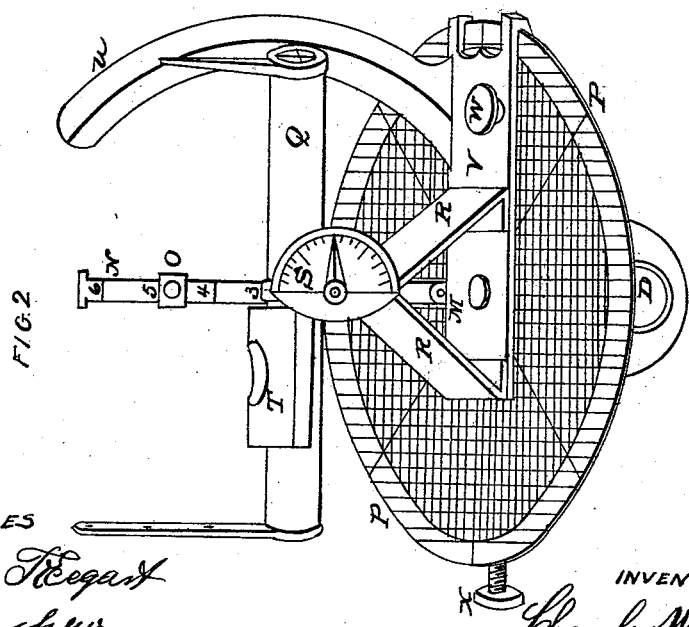
WITNESSES
INVENTOR
Charles Wilson

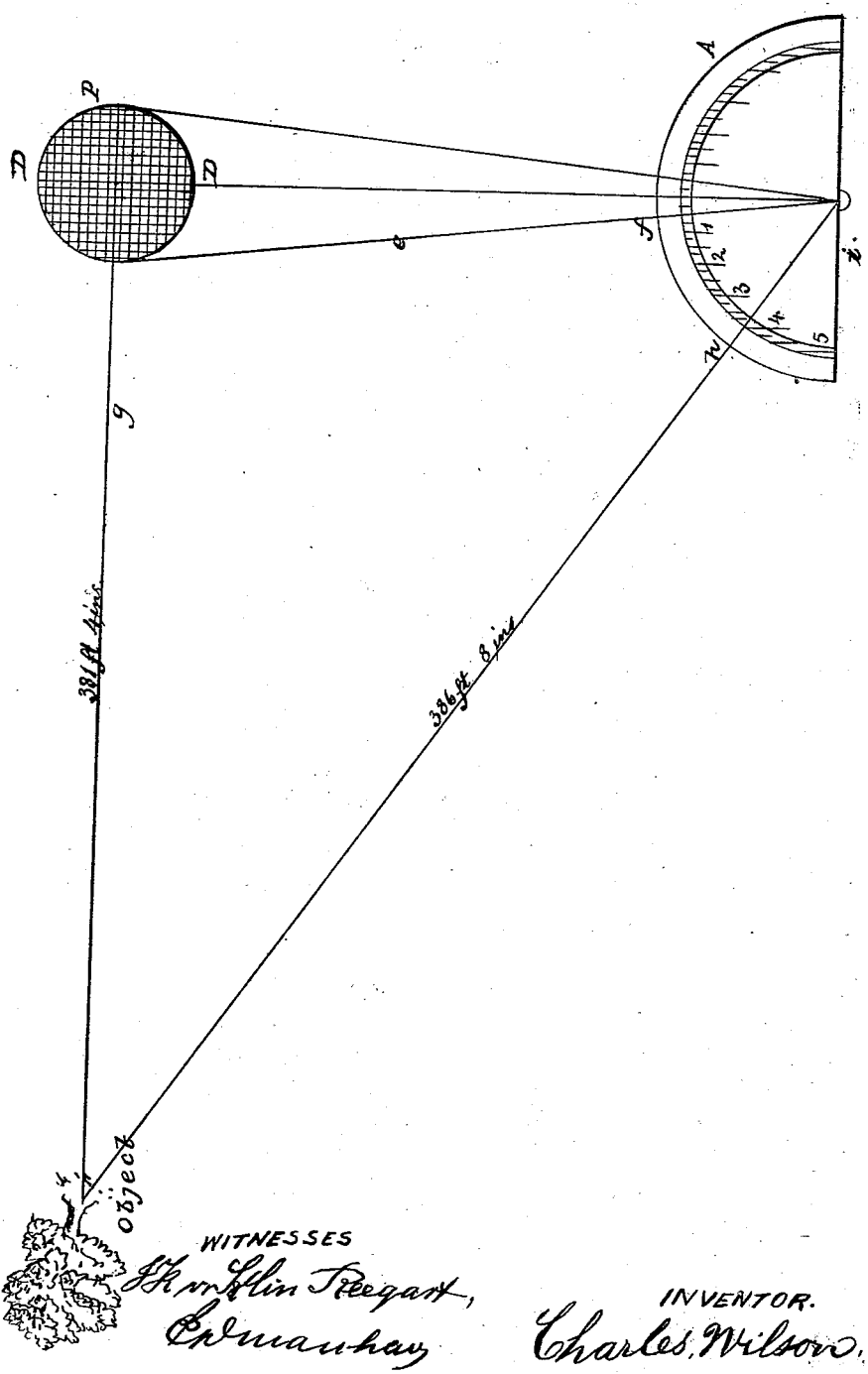

United States Patent Office.

CHARLES WILSON, OF CLINTON, PENNSYLVANIA.

Letters Patent No. 82,669, dated September 29, 1868.

IMPROVEMENT IN MEASURING HEIGHTS AND DISTANCES.

*The Schedule referred to in these Letters Patent and making part of the same.*

TO ALL WHOM IT MAY CONCERN:

Be it known that I, CHARLES WILSON, of Clinton, Allegheny county, State of Pennsylvania, have invented "a new and improved Mode of Measuring Heights and Distances;" and I hereby declare the following to be an exact description thereof, reference being had to the accompanying drawings, and to the letters of reference marked thereon, making a part of this specification, in which—

Figure 2 represents a perspective view of the horizontal plate, with its cross-lines, the vertical and adjustable target, telescope, and upright curved bar, with its cross-lines.

Figure 3 shows the under side of fig. 2, with its adjustable round and square plates, and adjustable screws for adjusting the telescope and target around or sidewise.

Figure 1:
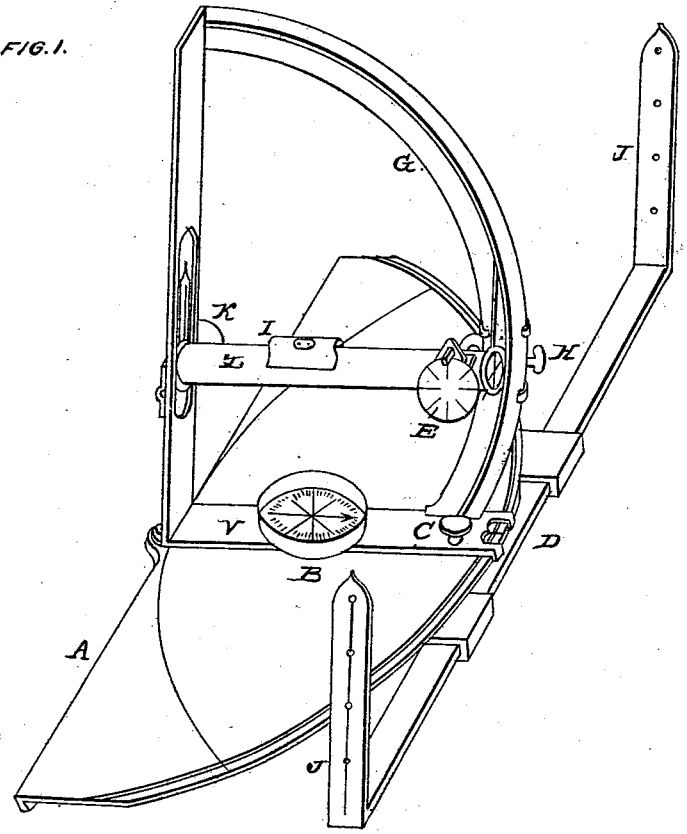
Figure 1 represents a perspective view of the compass, telescope, and their horizontal and upright measuring-devices.

Figure 4 exhibits the compass-plate, with its cross-lines at the station, the target at its location, and the object, with the angular lines of measurement drawn, so as to show the mode of getting the proper distances and length of each line from the station.

The nature of my invention consists in the circular plates, with their cross-lines, upon which the compass or target is operated; also the pivot-bars, by which the compass and telescope are moved around or sidewise; also the curved upright bars, for measuring the heights and supporting the telescope, with the compass or with the target; also the mode of adjusting the compass or target.

I measure heights and distances by means of the movable telescopes attached to circular plates, one being attached to the compass, and the other telescope being combined with the target, and both telescopes being operated with a circular movement, and adjusted to either side by adjustable plates and screws underneath the circulate plates, that are marked by straight lines and cross-lines, forming perfect square lines to the angle of sight.

A, the semicircular plate to which the compass, B, is attached, to give the course of every line struck; the plate being marked with regularly-drawn cross-lines, say one-eighth of an inch apart, and when the telescope and compass are set and adjusted by the set-screw C at any particular line of angle, at the point of any of those cross-lines to the right or left of the centre line, D. The telescope may then be adjusted outward by the set-screw E being turned one turn or more, so as to get the one-hundredth part of an inch, more or less, between the line of sight, and to get the line accurately, which is then the horizontal line of sight.

To get the height, the telescope is raised or lowered at its outer end until it is set or fixed at any one of the cross-lines required, marked on the curved upright bar G, where it is held and fastened by the set-screw H. The rear end of the telescope is then raised to agree with the spirit-level I.

The uprights J J are for the purpose of taking a sight for short distances that are always parallel with the outer edge of the semicircular plate A, and at right angles with the centre line, D. The index and plate K indicate the number of degrees, according to the raising or lowering of the telescope, L.

Having placed this telescope L with the centre line, D, of sight, and to the point which is the pivot-end, at M, of the target N, I get the distance or height from the centre line, M, of the target N, by moving the target up to get the height, or to either side to get the distance from the centre line, D, and I move the slide O, on the target, until the line of the telescope L strikes the centre of O, when I fasten the slide by a set-screw.

The pivot M is set on the circular plate P, (at its centre line D,) which has also regular cross-lines at right angles, marked on its upper side, and the centre of telescope Q is also pivoted on an upright frame, R, at the centre line, D. The index and plates S also indicate the degrees in raising or lowering the telescope.

The spirit-level T shows the level, and the curved upright bar U also exhibits, by its cross-lines, the height. The upright frame R and telescope Q move on a pivot-bar, V, on the top of the circular plate, P, and are also regulated by a set-screw, W, at top, and another screw, X, at the under side and bottom.

At the bottom are two plates, one square and the other circular, that are held together by two bolt-heads, Y Y, in slots Z Z, upon which the lower and square plate operates sidewise.

A third centre post, $a$, operates in the centre slot, $b$, with a set-screw, $c$, for the purpose of moving the telescope Q and target N sidewise.

(The same circular and square plates, with the devices Y, $a$, $b$, and Z, are also intended to be attached to the lower side of the plate A, to operate the compass B and telescope L in the same manner.)

To get the distance of a certain object, as at fig. 1, I place my compass, B, and telescope, L, on the centre line, D, (supposing the telescope L to be one foot in length.) I have one point of sight then fixed at the pivot-end of M of the target N, fig. 2. I then turn the target N down, (suppose the length of the target to be eight feet,) and then move the compass B and telescope around until they may strike the outer end of the target, (eight feet in length, as I suppose,) and in doing so, I moved the telescope and compass, say, one-half inch from the centre line, D, at the circumference of the plate A. The line then extends from the centre of the plate A, at D, to the outer end of the target, forming the line of sight, $e$, thus having moved the line $e$ one-half inch from the centre line, D, (viz, one-half inch in a foot, as at $f$.) It therefore gives the length of the centre line, D, by calculating one foot for every half inch that is in the length of the target; that is to say, one hundred and ninety-two half inches, the length of the target. I then have one hundred and ninety-two feet as the length of the line D.

Now, to get the second line, $g$, I turn the telescope Q to the object at right angle with the line D. I then turn the compass, B, and telescope L, of plate A, until the telescope L strikes the same object, and then suppose that this line crosses the circumference of the plate A, at $h$, within one-half inch of the rear line, $i$, when I calculate at once the number of half inches in the line D, (which are one hundred and ninety-two feet,) and I have three hundred and eighty-four feet, (supposing the telescope L to be one foot in length.) In moving it from the line D to $h$, suppose it to gain a quarter of an inch on each foot in the three hundred and eighty-four feet; that is two feet eight inches to be added to the three hundred and eighty-four feet, making three hundred and eighty-six feet eight inches, which is the distance of line $j$ from the station to the object, and the length of line $g$, the distance from the target to the object, is known by subtracting two feet eight inches from three hundred and eighty-four feet, making three hundred and eighty-one feet four inches, the correct length of line $g$.

Having got the length of the several lines, D, $g$, and $j$, I get the height by setting the front of the telescope L to the line of sight required, and marked on the upright bar G, and then, as in the length of the line D, the raising of the end of the telescope gives a foot for every half inch in height at the circumference of the plate A. Then, at the end of the one hundred and ninety-two feet, the height is eight feet, or, for instance, in one foot, rise of a half inch. I have two half inches in two feet, and three half inches in three feet, and so on, making eight feet rise at the end of the one hundred and ninety-two feet. Thus below or above the level of the instrument is the rise or fall in height.

What I claim as my invention, and desire to secure by Letters Patent, is—

1. The circular cross-lined plates A and P, with their curved upright bars G and U, combined and operated as herein described and for the purposes set forth.

2. The pivot-bars V, with their adjustable round and square plates, with regulating-screws C and X, constructed and operated as herein described and for the purposes set forth.

3. The adjustable target N, combined and operated with the telescope Q, as herein described and for the purposes set forth.

CHARLES WILSON.

Witnesses:
J. FRANKLIN REIGART,
EDM. F. BROWN.